(12) United States Patent
Price

(10) Patent No.: US 11,721,061 B2
(45) Date of Patent: Aug. 8, 2023

(54) METHOD AND APPARATUS FOR DISPLAYING A COLLECTIBLE

(71) Applicant: Paul Price, Austin, TX (US)

(72) Inventor: Paul Price, Austin, TX (US)

(73) Assignee: NUTILT IMAGING, LLC, Logan, UT (US)

( * ) Notice: Subject to any disclaimer, the term of this patent is extended or adjusted under 35 U.S.C. 154(b) by 162 days.

(21) Appl. No.: 15/441,930

(22) Filed: Feb. 24, 2017

(65) Prior Publication Data

US 2017/0256091 A1  Sep. 7, 2017

Related U.S. Application Data

(60) Provisional application No. 62/302,516, filed on Mar. 2, 2016.

(51) Int. Cl.

| | |
|---|---|
| *G06T 15/08* | (2011.01) |
| *G06T 19/20* | (2011.01) |
| *G06Q 30/0601* | (2023.01) |
| *G06T 15/20* | (2011.01) |
| G03B 35/02 | (2021.01) |
| G03B 37/02 | (2021.01) |
| *G06F 3/04815* | (2022.01) |
| *G06F 3/04817* | (2022.01) |
| *G06F 3/04845* | (2022.01) |
| *G06F 3/0488* | (2022.01) |
| *G06Q 10/087* | (2023.01) |

(52) U.S. Cl.
CPC ......... *G06T 15/08* (2013.01); *G06Q 30/0623* (2013.01); *G06Q 30/0643* (2013.01); *G06T 15/205* (2013.01); *G06T 19/20* (2013.01); *G03B 35/02* (2013.01); *G03B 37/02* (2013.01); *G06F 3/0488* (2013.01); *G06F 3/04815* (2013.01); *G06F 3/04817* (2013.01); *G06F 3/04845* (2013.01); *G06Q 10/087* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 2002/0065126 | A1* | 5/2002 | Miller | G07F 17/3244 463/20 |
| 2004/0124064 | A1* | 7/2004 | Sugata | G07D 5/005 194/328 |
| 2005/0093891 | A1* | 5/2005 | Cooper | G03B 17/18 345/649 |
| 2005/0187831 | A1* | 8/2005 | Gershburg | G06Q 10/087 705/27.2 |
| 2007/0132983 | A1* | 6/2007 | Van de Velde | G01N 21/87 356/30 |
| 2007/0200933 | A1* | 8/2007 | Watanabe | G08B 13/19643 348/211.11 |
| 2009/0147241 | A1* | 6/2009 | Shlezinger | G01N 21/87 356/30 |
| 2009/0197635 | A1* | 8/2009 | Kim | G06F 3/0346 455/550.1 |

(Continued)

*Primary Examiner* — Saptarshi Mazumder
(74) *Attorney, Agent, or Firm* — McHale & Slavin, P.A.

(57) ABSTRACT

A method and apparatus are provided to allow the viewing of an item from several virtual positions for evaluation and potential purchase. The information, including photographs, about the item is made available using the Internet.

14 Claims, 8 Drawing Sheets

(56) References Cited

U.S. PATENT DOCUMENTS

| | | | | |
|---|---|---|---|---|
| 2010/0283796 A1* | 11/2010 | Kramer | .............. | G06F 3/04845 |
| | | | | 345/629 |
| 2012/0306722 A1* | 12/2012 | Kim | ................ | H04N 21/21805 |
| | | | | 345/1.2 |
| 2013/0222656 A1* | 8/2013 | Kaneko | ................. | H04N 5/247 |
| | | | | 348/262 |
| 2013/0322730 A1* | 12/2013 | Borg | ....................... | G07D 5/02 |
| | | | | 382/136 |
| 2015/0268733 A1* | 9/2015 | Govindapillai | ......... | G06F 3/017 |
| | | | | 715/863 |

* cited by examiner

METHOD AND APPARATUS FOR DISPLAYING A COLLECTIBLE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/302,516, entitled, "METHOD AND APPARATUS FOR DISPLAYING A COLLECTIBLE", filed Mar. 2, 2016. The contents of the above referenced application are incorporated herein by reference in its entirety.

FIELD OF THE INVENTION

The present invention relates to a method and apparatus for photographing and displaying a collectible such as a coin or gem.

BACKGROUND OF THE INVENTION

Collectibles are frequently purchased without an in-person inspection. This leaves the collector who desires to purchase an object in a position to purchase the collectible, hereinafter item, by relying on an evaluation by a third-party, which is usually based on a standard rating system evaluation. For example, a coin might be rated as mint or fine. The problem with such evaluation systems is that it is up to the evaluator and their subjective opinion as to how the item should be scored or rated. In addition, there are several grading systems, and a purchaser would need to be familiar with each of the systems.

It is common to take a photograph of an item for showing to potential purchasers of the item at a remote location. This is commonly done using the Internet. Such a photograph can have low resolution or very high resolution to show additional detail, but the quality is not standard or known by the viewer. When a photograph is available online, a viewer can also change the size of the image on the screen to facilitate viewing of the item. Multiple images of an item from various viewing angles of the camera can also be provided, however, there is no standard. It is left up to the photographer as to what is shown and how well it is shown.

Many items that are to be viewed have reflective surfaces, particularly some coins that have a highly reflective mirror surface. Some have a luster surface and some have a tarnished surface. Further, in the case of coins, the coins have relief. Typically, the image is of an object, a person or an animal and is raised from the background. Still further, some coins have ultrahigh relief and the background is not flat, but may be dished. This causes the light projected onto the coin during photographing to be reflected differently from various portions of the coin surface. In addition, the coin has two sides or faces, one being the obverse face and the other being the reverse face, which is customarily different. Both faces should be available for viewing by a potential purchaser so that both sides of the coin can be evaluated.

Some imperfections that degrade the value of an item are made more visible by changing the angle of light reflecting off of the surface being viewed. This can be done by moving the light illuminating the coin surface or by changing the angle of the coin surface relative to the light source; however, this requires that the viewer have physical possession of the item.

Thus, there is a need for an improved method of viewing a collectible item when physical possession of the item is inconvenient or not possible.

SUMMARY OF THE INVENTION

The present invention involves the provision of a method of viewing a collectible item using photographic means to better illustrate the details, imperfections and quality of the item.

The present invention also involves the provision of a method that utilizes a plurality of photographs viewable from a location remote from the item itself utilizing a computer device for the viewing.

The present invention also involves the provision of a method that utilizes a cell phone (a smart phone) as the viewing computer device and accesses the photograph file through the Internet, or locally on a storage device.

The present invention also involves the provision of a method that utilizes a PC (personal computer) as a viewing computer device and accesses the photograph file through the use of an input command device such as a mouse or touch screen.

The present invention also involves the provision of an Internet-based system for searching for an item and providing access to a plurality of photographs of an item for quality evaluation of the item.

Other objects and advantages of this invention will become apparent from the following description taken in conjunction with any accompanying drawings wherein are set forth, by way of illustration and example, certain embodiments of this invention. Drawings contained herein constitute a part of this specification and include exemplary embodiments of the present invention and illustrate various objects and features thereof.

DETAILED DESCRIPTION OF THE INVENTION

Figure 2:
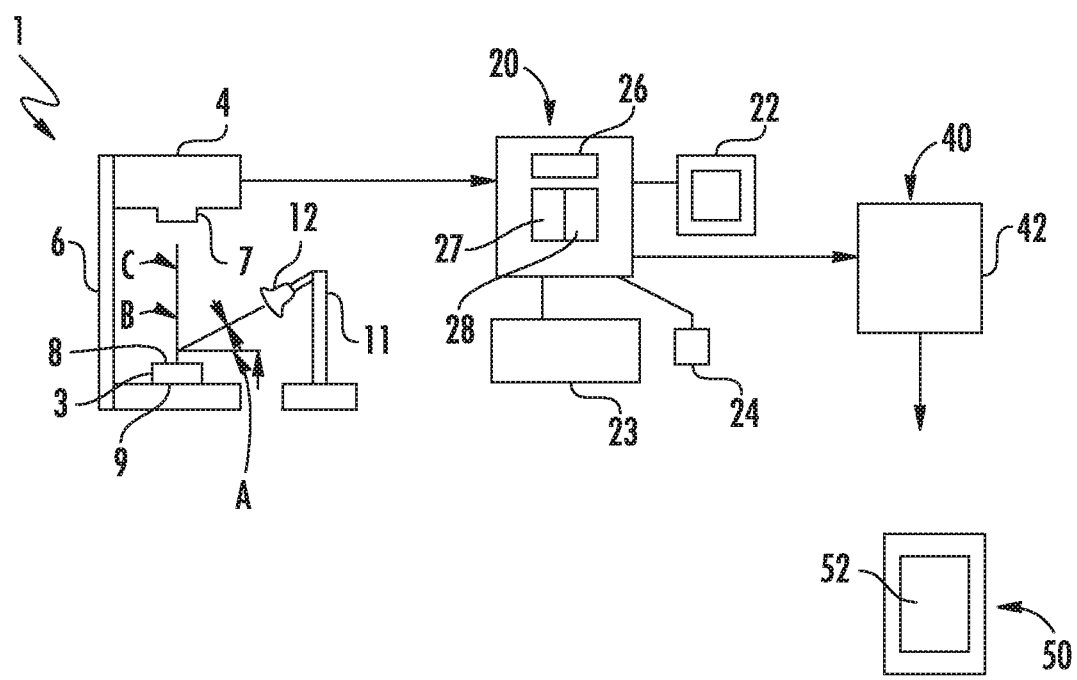
FIG. 2 is a schematic illustration of the photography system of the present invention.

FIG. 2 schematically illustrates an Internet-based system, designated generally 1, for viewing a collectible item 3; the item 3 is preferably a three dimensional item such as a coin or gem. The item will hereinafter be referred to and described as a coin 3, but can be any suitable item, preferably one that is graded for quality. The system 1 is operable to permit viewing of the exterior of a coin, but can also be used to see the interior of transparent objects, such as a gem. The system 1 includes a camera 4 held in position by a suitable support 6 in position over the coin 3. In a preferred embodiment, the central axis of the lens 7 is generally coaxial with the center of one of the two faces 8, 9. For clarity, the face 8 is the obverse face and the face 9 is the reverse face. An illuminating device, designated generally 11, is positioned adjacent to the coin 3 and has a lamp 12 positioned to direct light, preferably in the human visible spectrum, onto the face 8 and at an angle A. It is to be understood that a plurality of lamps 12 could be used. Either the lamp 12 is movable about the coin 3, or the coin 3 is movable about its central axis 5 (FIG. 4) so that the light is projected onto the coin at different rotational positions as described below. The spacing between the lamp 12 and the coin 3 can also be varied for different photographs.

The camera 4 is operable to take photographs of the coin 3 in a digital format. The camera 4 may be connected to a computer system 20, such as a PC, wirelessly or by wire, and can have a primary storage (commonly referred to as memory) and/or a secondary storage device that can be removed and read by the computer system 20 to transfer the digital images thereto for subsequent storage, distribution and processing. Primary and secondary storage are herein referred to as "storage" collectively, and can include one or both primary and secondary storage. In the illustrated structure, the computer system 20 includes a display device 22, such as a screen or monitor, and one or more input devices, such as a keyboard 23 and/or mouse 24. It is to be understood that the display device 22 could be a touch screen, which could also function as a command input device. The computer system 20 can include a processor 26, secondary storage 27 and memory 28. It is to be understood that the computer system 20 could be part of the camera, as in a smart phone.

The Internet system is designated generally 40, and is connected to the computer system 20 by any suitable means such as wireless, for example Bluetooth, or hardwired or both, as are known in the art. The structure of the Internet is well known and typically includes a plurality of servers 42 (computers that have processors and storage) and is positioned between the computer system 20 and other Internet communication capable devices 50 as is known in the art. A typical Internet communication capable device 50 can be a smart phone, tablet, pad, laptop, PC or the like, as are known in the art. A preferred device 50 is a smart phone or other portable device. It is to be understood that a PC that is associated with a suitable command input device such as a mouse, touch screen (which can have a pinch screen function) or voice input device can be used as well. The device 50 would typically have a processor, storage, an input device such as a touch screen 52 or mouse, and an output device such as the touch screen 52 or monitor. In the case of a smart phone and other portable devices, its connection to the Internet 40 is wireless, but could be by wire or both. It is to be understood that the functions of one or more of the computer system 20, Internet system 40 and device 50 could be combined into a single computer system such as a PC located at, for example, a coin shop to display its inventory. It is also to be understood that the programming to effect the operation of the system herein described can reside on any one or more of the described computers 20, 40, or 50.

In the case of smart phones and the like, they have internal components such as GPS, gyroscopes and accelerometers (not shown) that allow the image on the screen 52 to be changed by movement of the device 50. The image on the screen 52 can also be adjusted for size as is known in the art, such as by having a pinch screen. The system 1 can also be configured such that the image on the display device 22 can be zoomed in on, scrolled about or pinched to show the coin 3 from different angles and in different angular aspects using a touch screen function or the like. This would also permit viewing the coin 3 with different lighting effects.

The system 1 can also be used in association with a virtual reality device, such as viewing goggles (not shown). Instead of viewing the coin 3 on the screen of the device 50, the coin 3 can be viewed using the virtual reality device, and movement of such device can be used to change the viewing angle of the coin 3. The device 50 can be used in association with the virtual reality device to assist in also controlling the view, e.g., pinching the screen of device 50 to control image size. It can also simulate holding the collectible in a virtual environment.

Figure 4:
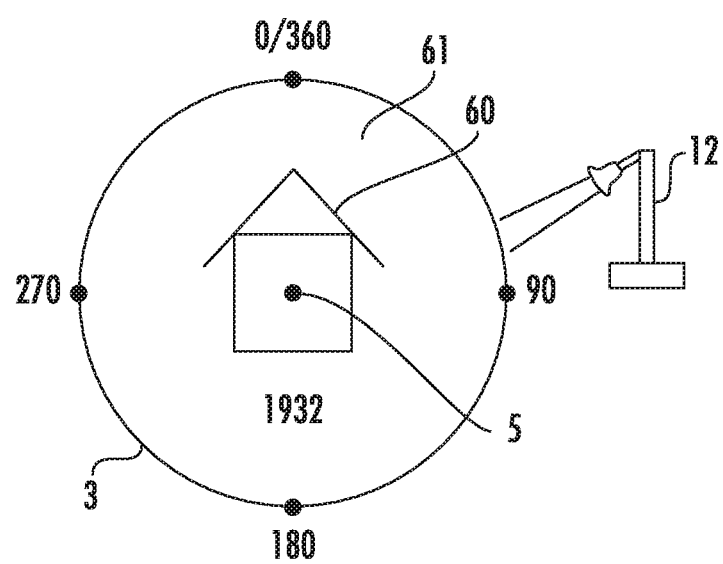
FIG. 4 is a plan view of a representative coin showing one face thereon.

In order to utilize the system 1, a coin 3 (or other item 3) is placed in a suitable position relative to the lens 7 for photographing (making digital images) its exterior and/or interior. As shown, the central longitudinal axis of the lens 7 is generally normal to one of the faces 8, 9; however, it is to be understood that this angle can range between 90° and about 15°. The desired obverse or reverse side, 8, 9, respectively, of the coin 3 is placed to face the lens 7. Both sides of a coin are preferably photographed. The illuminating device 11 is placed in a suitable position relative to the coin 3, and the angle A of the lamp 12 is adjusted to a desired angle to show surface flaws and imperfections. The spacing of the coin 3 from the lamp 12 can be adjusted, as can the spacing from the lens 7, both of which can be changed for different photographs. In a preferred embodiment, the angle A is measured from the plane of one of the faces 8, 9 of the coin 3, which is shown as being generally horizontal, and is in the range of between about 15° and about 80°. The angle B of the light to the longitudinal axis of the lens is in the range of between about 10° and about 75°. A coin 3 is illustrated in plan view in FIG. 4, and has an image 60 that is raised from the background 61. The coin 3 can be considered to have a perimeter of 0-360° (any orientation measuring system can be used), about which the lamp 12 would be positioned in preselected positions relative to this perimeter. As seen in FIG. 4, the lamp 12 is positioned at 90° on the perimeter and projects at about 45° onto the coin 3. While any suitable number of positions about the coin 3 can be utilized, the present description will describe the lamp being positioned at four positions, which, in this example, would be 0°, 90°, 180° and 270°; 0° and 360° being the same perimeter position. The choice of positions and light angle can be standardized for each type of coin to better display the coin. This example will be described in terms of moving the lamp 12 about the perimeter of the coin 3. It is to be understood, however, that the position of the illuminating device 11 could be fixed and the camera 4 and/or coin 3 could be moved. Any form of relative movement or combination of types of movement can be used. The angle A of the lamp 12 will be determined by the particular coin and the amount of relief of the image 60 relative to the background 61. In a typical coin, the elevation of the image 60 relative to the background 61 would be on the order of about 0.050 inches or less. The surface finish on the face and background to be photographed can also be taken into account for setting the angle A and the perimeter positions of the lamp 12. A series of photographs are taken of the coin 3 in a sequential series utilizing the different perimeter positions of the lamp 12; in this example, four photographs are taken of one face and stored in the computer system 20. The opposite face can be similarly photographed. For coins, it is preferred that the top of each side be at a predetermined perimeter angle, say 0°.

The camera 4 can be moved or tilted from the axis of the lens 7, being generally normal to the plane of a coin face 8, 9, e.g., 45°. This tilt angle, shown also as angle C, can be in the range of between about 90° and about 0°. This type of position can then show a side edge of the coin 3 or the side of a gem or the like. Similar perimeter location photos can then be taken. Thus, the camera 4 or item 3 are moved multiaxially, e.g., biaxially, relative to one another.

Identifying indicia can also be recorded and attached to the file of photographs, such indicia including date, coin identifiers, such as country, denomination, production mint and the like, price, contact information and other sales related information for transmission to a potential viewer using the device 50, and to help the viewer bind coins of interest. A rating under one of the coin rating systems can also be provided. Gems also have standard rating systems. The file containing the photographs and other data are transmitted to the Internet 40 for access by potential purchasers or others through a suitable search engine.

The photographs (digital images) can be combined by any suitable technique, such as stitching together or compositing after loading to storage in one of the computer devices 20, 40, 50, or combined when accessed for viewing, or both. Combining can make a single image file that can be manipulated for screen viewing to simulate a motion picture type viewing of the coin 3 instead of a plurality of still images as described below. Although, if desired, the user can view each of the digital image files separately. The combined images can be used to form a screen viewable simulated 3D reconstruction image from the multiple digital images.

Figure 3A:
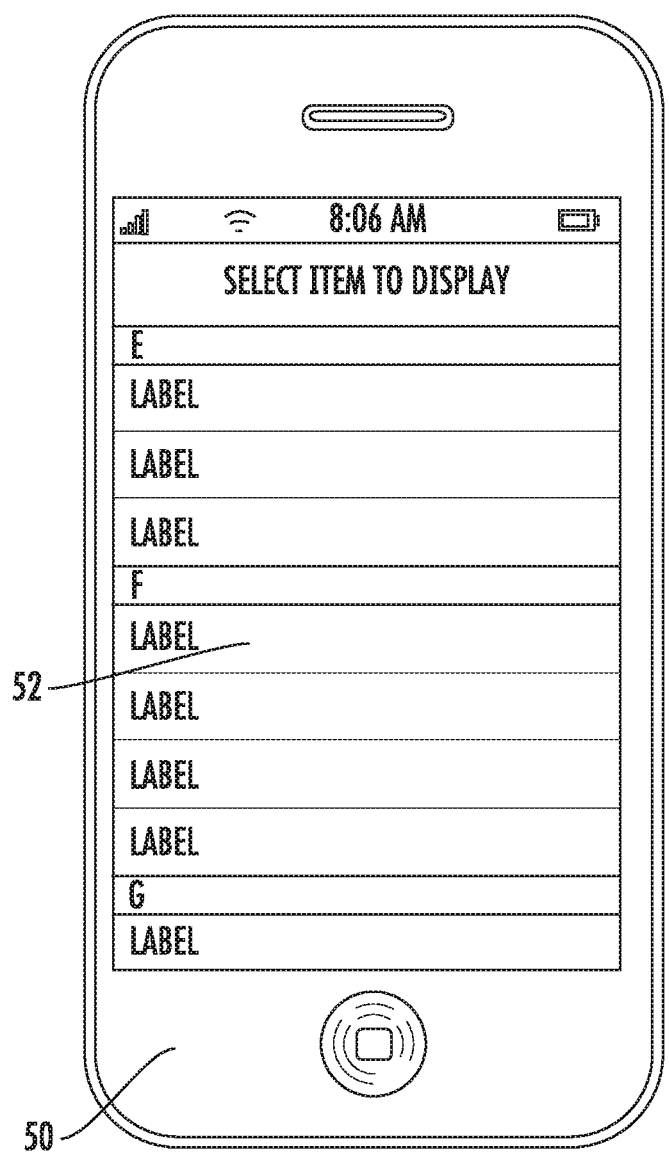
FIGS. 3A-3C illustrate various screenshots on a smart phone utilized in the present invention.
Figure 3B:
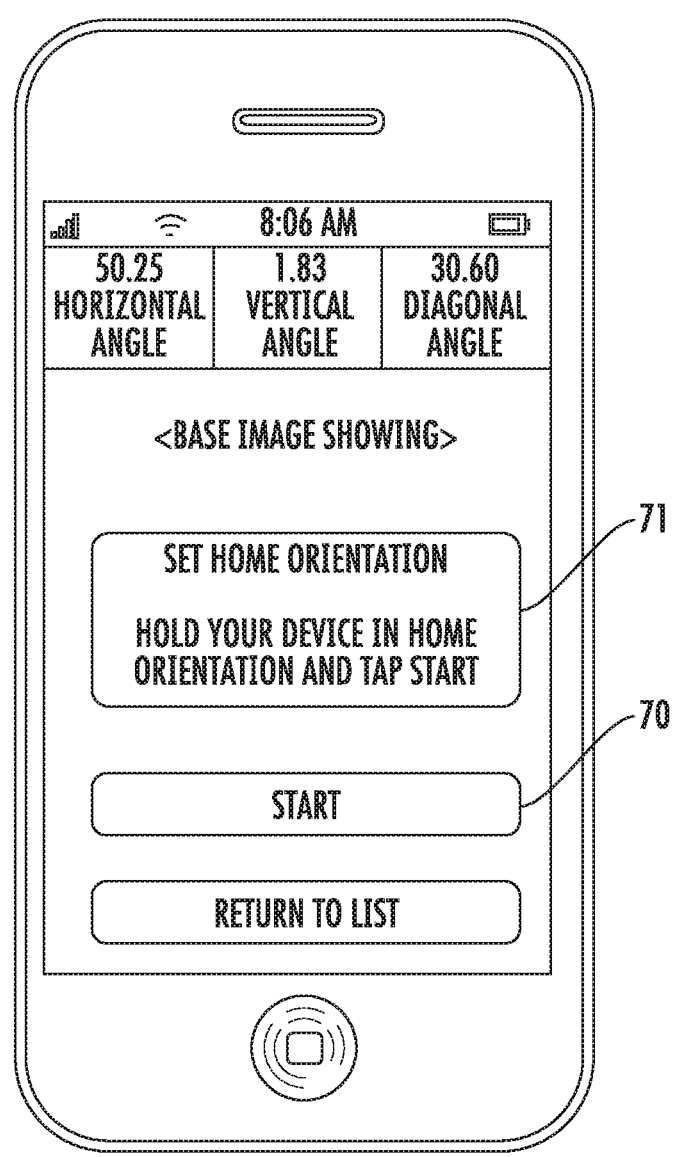
Figure 3C:
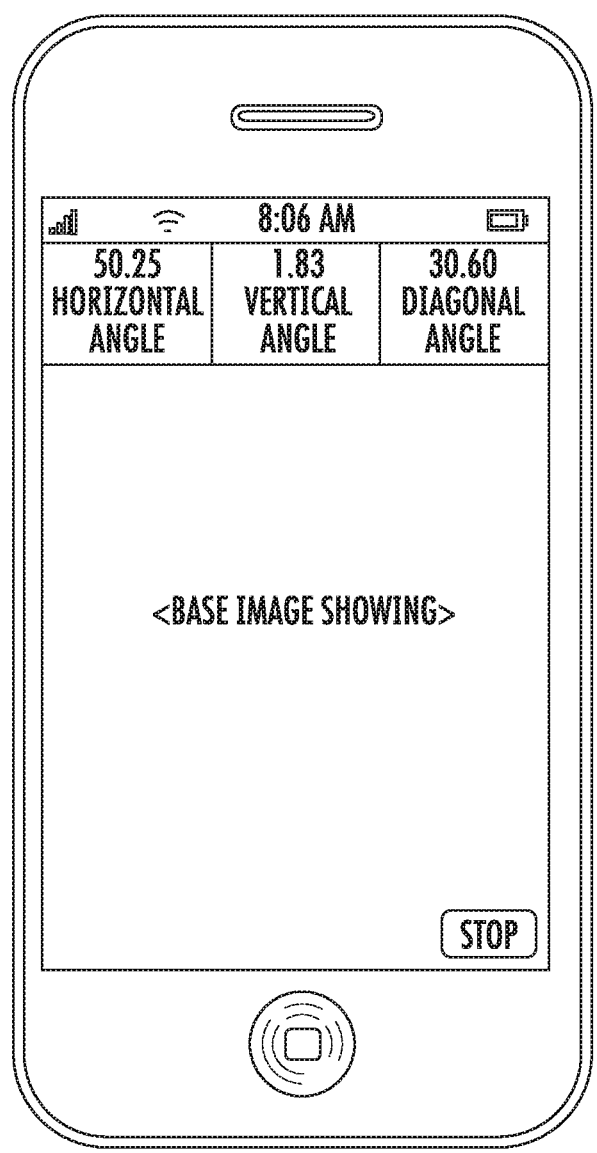
Figure 5A:
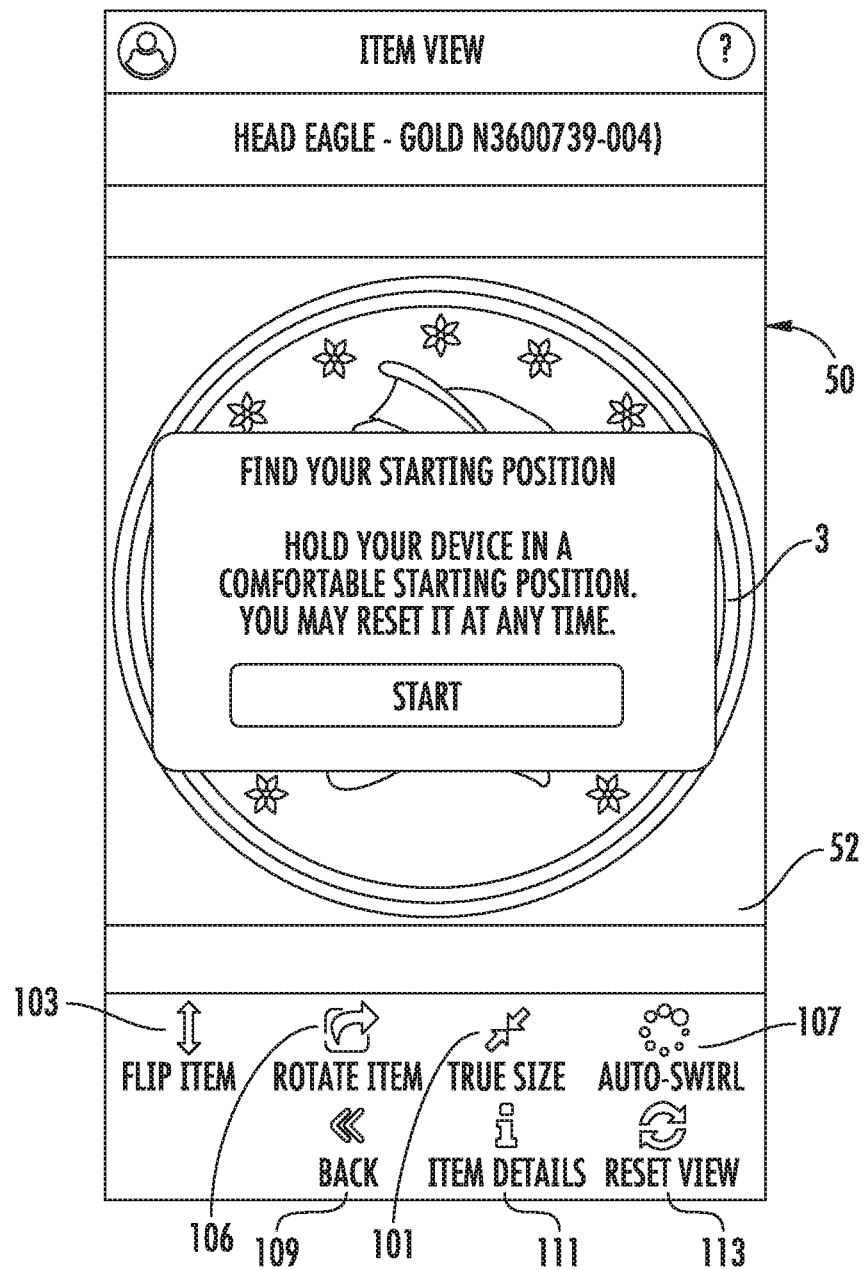
FIGS. 5A, 5B show screens shots on a display screen.

The provided information can be displayed on the screen 52 of the device 50 as seen in FIGS. 3A and 5A. The user of the device 50 can find a coin of interest by searching the Internet or web, and then selecting a coin of interest using the menu seen in FIG. 3A. After the selection, a screen, such as seen in FIG. 3B, would be displayed showing a series of instructions for the user to select from for display of the selected coin on the screen 52. In this example, the user would select Start at the icon 70 to initiate viewing of the selected coin. An instruction icon 71 is visible on the screen 52 to provide the user with instructions on how to hold the device 50 in a starting position, and icon 70 is tapped when viewing start is desired. The instructions can be skipped by those already knowledgeable on use of the system. Touch screen commands can also be used, such as rotate and change item size.

Figure 1:
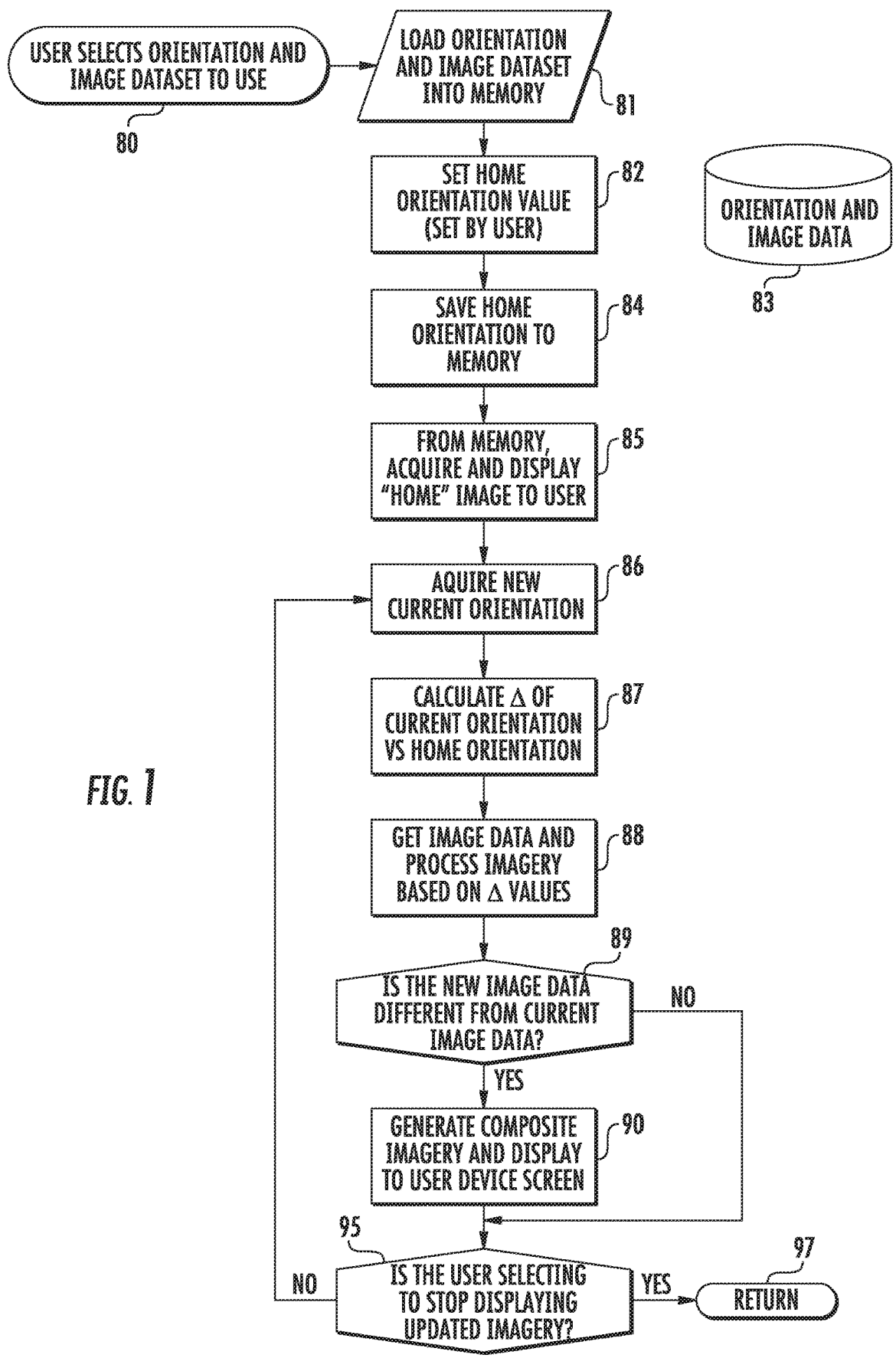
FIG. 1 is a flowchart of programming logic related to determining which imagery to show on the display device based on the orientation of the display device.

FIG. 1 illustrates software logic for a preferred method of selecting which of the views of the coin 3 is to be displayed on the screen 52. Each view would be a separate photograph; in the example herein, four photographs would be available for viewing. By utilizing the built-in devices, such as the accelerometers and gyroscopes, movement of the phone can be used to select a particular image file. The steps are represented by the block 80 in FIG. 1. The images and their associated data are loaded into the memory or storage of, e.g., the device 50, as at 81. The user then sets the home orientation value of their choice at 82 from the position of the device 50 for which data is obtained from the orientation and image data at 83. The device 50 stores the positional data as the home positional data as at 84. The user can use a suitable input device such as a mouse, voice command device, touch screen or the like, when using a PC. From the device 50 memory or storage, the user requests and displays the home image, as at 85; for example, this could be the photograph taken at 0° light angle. The device 50 and/or Internet 40 has programming that allows the device 50 to acquire other images in the coin file through movement of the device 50, for example by tilting or moving forward, tilting or moving back, tilting or moving to the right and tilting or moving to the left. The device 50 would then, through the programming, calculate the degree of movement, and from that determine which of the photographs in the image file has been selected and then subsequently display that image on the screen 52. See steps 86-90 in FIG. 1. The coin 3 is thus displayed in an orientation as if the screen 52 was generally parallel to the displayed surface of the coin 3. In the case of moving the device 50 back or forward as opposed to tilting, the programming can effect the calculation of the change in the X-Y coordinate positions of the device 50 to select the desired photograph. Vertical and horizontal movement of the device or touch screen commands can also be used to move the coin 3 on the screen 52. If the device 50 has the control programming, it can be provided as a so called app. Thus, the coin 3 has simulated movement from movement of the device 50. The device 50 can also be configured to read a QR code to call up the file for a particular collectible. The above steps can be accomplished on a PC using its input device(s) as known in the art.

During display of the coin 3, the programming is operable to keep the coin stationary while the light moves about the coin. Alternately, the light can be stationary while the coin is moved, as by rotating.

Figure 5B:
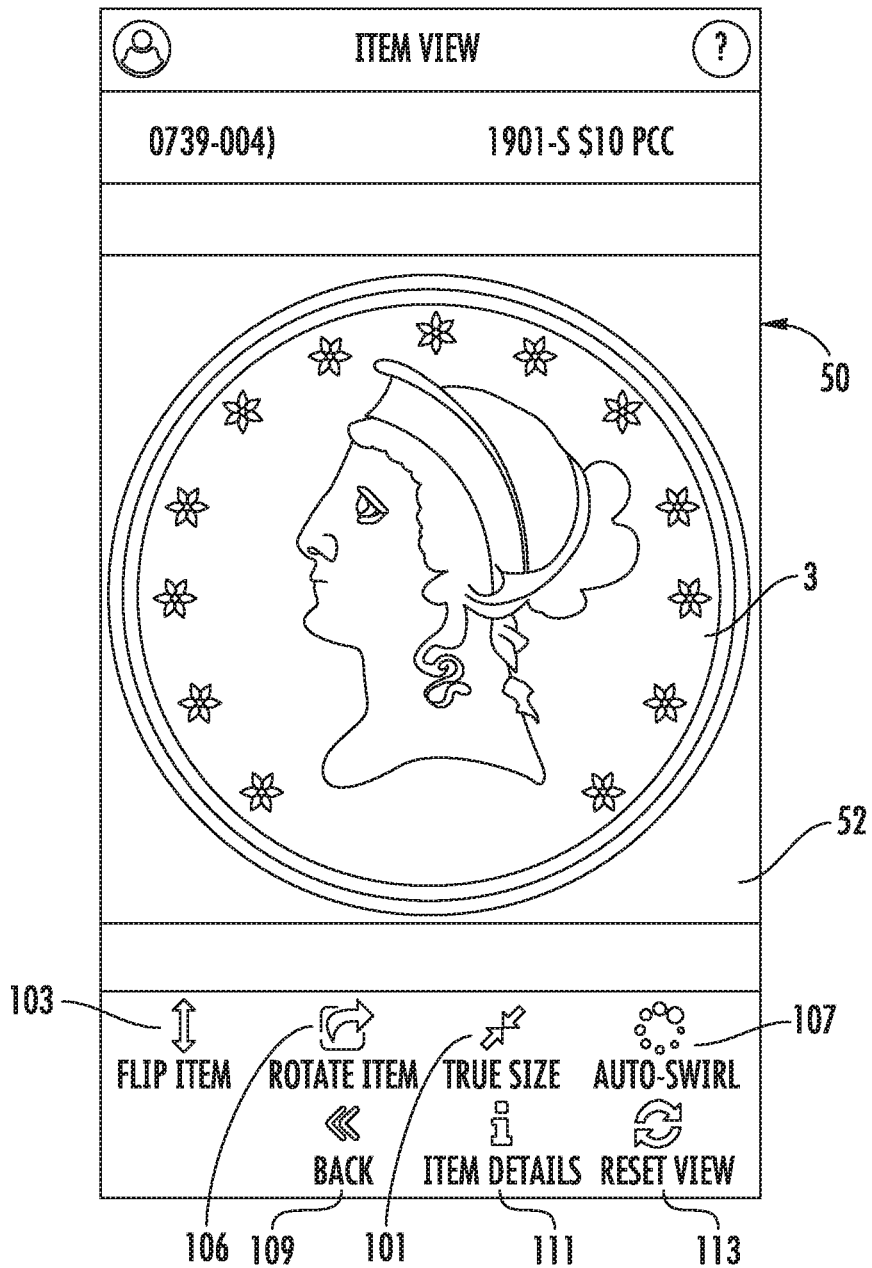

FIGS. 5A, 5B illustrate an alternative screen for effecting operation of the above described system.

The device 50 and/or the Internet system 40 and/or computer system 20 can be programmed to effect display of the coin 3 in true size by entering a command on the device 50 using icon 101 denoted "True Size". The device 50 and/or Internet system 40 and/or computer system 20 can be programmed to effect simulation of movement of the coin 3 relative to the illumination device 11 by entering a suitable command, e.g., by contacting a screen icon. The screen 52 in FIGS. 5A, 5B illustrates multiple additional display functions for the coin 3. A screen icon 103 denoted "Flip Item", when activated, will change between front and back views. Activating the icon 106, denoted "Rotate Item", will effect rotation of the coin 3 about its central axis. The device 50 and/or Internet system 40 and/or computer system 20 can be programmed to effect simulation of movement of the light around the coin by entering a suitable command, e.g., by contacting a screen icon 107 denoted as "Auto Swirl" or moving the device 50 as described above. Activating the icon 109, denoted "Back", will effect taking the function back to the previous function or view. Activating the icon 111, denoted "Item Details", will provide a listing of coin details such as denomination, year, grade, mint, price, etc. Activating icon 113, denoted "Reset View", will bring the user back to the screen shown in FIG. 3B that is also the logic point 82 in FIG. 1.

The device 50 can be programmed to display the backside of the coin 3 by selecting backside pictures. It can also be programmed to effect movement of the light about the coin 3.

The photographs are preferably viewed separately, and changing from one to another can be stepped, and optionally using a fade out to a fade in to blend the sequential photos. The programming of the viewing device 50, the internet system 40 and/or the computer system 20 can be such as to stitch or knit the photographs together, allowing for continuous or seamless transition between photographs for viewing from various virtual vantage points.

When the user has completed viewing of the selected coin 3, the user can then stop viewing of the coin at 95 and return it to the start menu at 97 (screen icon 109, FIG. 5A), or return to selecting a new coin at 86.

If the viewer wishes to purchase the coin, the programming can allow the viewer to effect an offer to purchase.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system for viewing a collectible, the system comprising;
    a smart phone which includes a computer and processor, a display device, an input device, at least one storage device, an Internet system and an Internet access device, and at least one gyroscope operably connected together;
    the system further including a camera, a frame for supporting the camera and the collectible; a lamp which shines light on the collectible; wherein the lamp is configured to move around the collectible or the collectible is configured to move around the lamp, and the lamp is configured to illuminate the collectible at vertical, horizontal and diagonal angles, the camera capturing a plurality of first digital images of the collectible at incremental axial rotation positions;
    the camera configured to electrically transfer the plurality of first digital images to the at least one storage device via the Internet system and an Internet access device as one or more files stored therein; the one or more files containing the plurality of first digital images combined to form a plurality of second digital images of the collectible item taken at different angular positions of exposure to light about a vertical central axis of the collectible, the smart phone configured to display the plurality of second digital images as a simulated 3D reconstruction of the collectible item on the display device, illustrating a plurality of rotational positions and a plurality of lighting directions of the collectible item by tilting the smart phone in different directions, so that said collectible item appears to rotate about said vertical central axis by sequentially displaying said plurality of second digital images upon said display device to provide said simulated 3D reconstruction, said at least one gyroscope sensing said smart phone tilting.

2. The system of claim 1, wherein the smart phone includes at least one accelerometer, the accelerometer cooperating with said at least one gyroscope to rotate the 3D reconstruction of the collectible for viewing.

3. The system of claim 1, further including the computer or smart phone having a touch screen operable to selectively display a plurality of control icons; the control icons being operable to at least one of: effect rotation of the collectible, show the collectible in true size, flip the collectible to view an opposite side thereof, effect light rotation relative to the displayed collectible item, and provide details of the displayed collectible item.

4. The system of claim 1, wherein at least some of the second digital images are combined to form a third simulated 3D digital image and the system being programmed to display the third simulated 3D digital image in response to at least one control command, wherein said third simulated 3D image is representative of a specific lighting directed at said collectable.

5. The system of claim 1, wherein the smart phone being movable and being programmed to calculate the degree of movement of the smart phone utilizing said at least one gyroscope and determine which of the previously acquired second digital images has been selected by the movement and then subsequently display that image on the display device of the smart phone.

6. A method of viewing a collectible, the method comprising:
    creating a plurality of first digital images of a collectible item through the use of a system including a smart phone which includes a computer and processor, a camera, a display device, an input device and at least one storage device, and a frame for supporting the camera and the collectible item;
    storing a plurality of first digital images on the at least one storage device, the first digital images each including projected light on the collectible item at different angular positions light about a perimeter of the collectible item, wherein a lamp is configured to move around the collectible item or the collectible item is configured to move around the lamp in each successive first digital image, and the lamp is configured to illuminate the collectible at vertical, horizontal and diagonal angles;
    storing the first digital images in the at least one storage device with the storage device one or more files therein;
    combining said first digital images to form a plurality of second digital images in a second file that is operable to produce a simulated 3D reconstruction of the collectible item for display;
    accessing the second file with an access device and displaying the simulated 3D reconstruction as a series of said second images in a successive sequence on the display device with the lighting of the collectible in the displayed 3D reconstruction series of said second images appearing to be at said different angles moved about the perimeter of the displayed collectible item;
    the smart phone being programmed to display the 3D reconstruction of said plurality of second digital images of the collectible on the display device by tilting the smart phone in different directions causing said 3D reconstruction of said collectible to be displayed appearing as a clockwise or counterclockwise movement of said collectible appearing to axially rotate with the projected light appearing to remain stationary, said smart phone including at least one gyroscope, said at least one gyroscope constructed and arranged to sense said tilting of said smart phone.

7. The method of claim 6, wherein the simulated 3D reconstruction image is displayed in a manner where the collectible is viewed without axial rotation of the collectible item and with axial rotation of the light about a perimeter of the collectible item.

8. The method of claim 6, wherein the orientation of the image viewed is selected by at least one input command.

9. The method of claim 8, wherein the input command being input by activating a screen icon.

10. The method of claim 8, wherein the input command being input by moving the smart phone.

11. The method of claim 6, wherein the smart phone includes an Internet system and an Internet access device, the first digital images transferred to the smart phone via the Internet system and Internet access device.

12. The method of claim 11, wherein the plurality of first digital images on the at least one storage device of the smart phone are transferred via the Internet system and Internet access device to a second smart phone for viewing as the 3D reconstruction image on the second smart phone.

13. The method of claim 6, wherein the smart phone includes at least one accelerometer operating in conjunction with said at least one gyroscope, the smart phone being operable to tilt the 3D reconstruction of the collectible item for display on the display device.

14. The method of claim 6, wherein the collectible item is a coin; the first digital images including digital images of both the obverse and reverse faces of the coin.

* * * * *